US008208925B2

(12) United States Patent
Attar et al.

(10) Patent No.: US 8,208,925 B2
(45) Date of Patent: Jun. 26, 2012

(54) METHOD AND APPARATUS FOR INTER-SYSTEM HANDOVER

(75) Inventors: Rashid Ahmed Akbar Attar, San Diego, CA (US); Durga Prasad Malladi, San Diego, CA (US); Francesco Grilli, La Jolla, CA (US); Kirti Gupta, La Jolla, CA (US); Lorenzo Casaccia, Rome (IT); Nathan Edward Tenny, Poway, CA (US); Oronzo Flore, Ostuni (IT)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/100,802

(22) Filed: May 4, 2011

(65) Prior Publication Data

US 2011/0206009 A1 Aug. 25, 2011

Related U.S. Application Data

(63) Continuation of application No. 12/033,689, filed on Feb. 19, 2008.

(60) Provisional application No. 60/891,025, filed on Feb. 21, 2007.

(51) Int. Cl.
*H04W 36/00* (2009.01)
(52) U.S. Cl. ........ 455/436; 370/331; 455/437; 455/438; 455/439
(58) Field of Classification Search .......... 370/331–334; 455/436–439, 440, 452.2, 574
See application file for complete search history.

(56) References Cited

U.S. PATENT DOCUMENTS

| 5,175,867 A | 12/1992 | Wejke et al. |
| 5,428,816 A | 6/1995 | Barnett et al. |
| 5,666,650 A | 9/1997 | Turcotte et al. |

(Continued)

FOREIGN PATENT DOCUMENTS

EP 1565030 A1 8/2005

(Continued)

OTHER PUBLICATIONS

3GPP TS 25.304 V7.1.0 (Dec. 2006), 3rd Generation Partnership Project; Technical Specification Group Radio Access Network; User Equipment (UE) procedures in idle mode and procedures for cell reselction in connected mode (Release 7).

(Continued)

*Primary Examiner* — Kent Chang
*Assistant Examiner* — Dinh P Nguyen
(74) *Attorney, Agent, or Firm* — Steven A. Raney

(57) ABSTRACT

An inter-system handover system for a wireless communication system supports hand-down and hand-up of user equipment (UE) to different radio access technologies, including synchronous and asynchronous systems. Latency and handover connection failures are reduced by an access node (nodeB) broadcasting information about neighboring systems (targets) when the UE reception (RX) capability is both inside or outside the reception range of the target. A single RX chain is sufficient, although transitioning between a wireless wide area network (WWAN) to a wireless local area network may (WLAN) may advantageously benefit from simultaneous operation on two Rx chains. Optimized list of neighboring RAT systems (targets) are broadcast from the network, including measurement parameters and reporting instructions. Thereby, UE-driven reporting minimizes latencies. UE reports other-system searches to network only if needed for a handover. In addition, handover requests can be bundled with other-system measurement information, if necessary, for additional efficiencies.

30 Claims, 11 Drawing Sheets

U.S. PATENT DOCUMENTS

| | | |
|---|---|---|
| 6,195,551 B1 | 2/2001 | Kim et al. |
| 6,526,039 B1 | 2/2003 | Dahlman et al. |
| 2003/0013443 A1 | 1/2003 | Willars et al. |
| 2003/0081571 A1 | 5/2003 | Hur |
| 2004/0116110 A1* | 6/2004 | Amerga et al. ............ 455/422.1 |
| 2005/0208942 A1 | 9/2005 | Pekonen et al. |
| 2005/0288017 A1 | 12/2005 | Doumenc et al. |
| 2006/0276190 A1 | 12/2006 | Shaheen |
| 2007/0030830 A1 | 2/2007 | Sagne et al. |
| 2007/0264955 A1 | 11/2007 | Tsai et al. |
| 2008/0096557 A1* | 4/2008 | Rinne et al. ................ 455/435.1 |
| 2008/0132225 A1* | 6/2008 | Ranta et al. .................... 455/424 |
| 2008/0167089 A1* | 7/2008 | Suzuki et al. ................. 455/574 |
| 2008/0181127 A1 | 7/2008 | Terry et al. |

FOREIGN PATENT DOCUMENTS

| | | |
|---|---|---|
| KR | 100602836 B1 | 7/2006 |
| RU | 2258307 | 8/2005 |
| WO | WO9836607 | 8/1998 |
| WO | WO9838827 | 9/1998 |
| WO | WO0207459 A2 | 1/2002 |
| WO | WO02065808 | 8/2002 |
| WO | WO03032509 A1 | 4/2003 |
| WO | WO2006124950 A2 | 11/2006 |
| WO | WO2006124951 | 11/2006 |

OTHER PUBLICATIONS

3GPP TS 25.331 V7.3.0 (Dec. 2006).

Dorot, V.et al.: "An Explanatory Dictionary of Modern Computer Terms," 2nd Edition, bhv, Saint Petersburg, 2001, 'Program Product' on p. 339.

Golovin O.V. et al., "Radio Communications", Moscow, Goryachaya Liniya—Telekom, 2001, p. 19.

International Search Report and Written Opinion—PCT/US2008/054444, International Search Authority—European Patent Office—Jun. 20, 2008.

Translation of Office Action in Korean application 10-2009-7019694 corresponding to U.S. Appl. No. 12/033,689, citing WO2006124950A2, US20030013443 and KR10602836 dated Mar. 10, 2011.

* cited by examiner

(12)  US 8,208,925 B2

METHOD AND APPARATUS FOR INTER-SYSTEM HANDOVER

CLAIM OF PRIORITY UNDER 35 U.S.C. §119

The present application for patent is a continuation of U.S. patent application Ser. No. 12/033,689 entitled "METHOD AND APPARATUS FOR INTER-SYSTEM HANDOVER" filed Feb. 19, 2008, which claims priority to U.S. Provisional Patent Application No. 60/891,025 entitled "A METHOD AND APPARATUS FOR INTRA-SYSTEM HANDOFF" filed Feb. 21, 2007; both of which are assigned to the assignee hereof and incorporated herein by reference.

FIELD OF INVENTION

The present description pertains to inter-system handovers of user equipment and, more particularly, to reducing latency and handover failure between different radio access technologies.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out, single-in-multiple-out (SIMO) or a multiple-in-multiple-out (MIMO) system.

Due to data traffic, channel characteristics, or mobility of user equipment (UE), a need frequently arises for a particular UE to be handed over (i.e., hand-down, hand-up, etc.) between different access nodes. This handover process is complicated by the various states that a UE can be in for battery savings or channel efficiency (e.g., idle, active, discontinuous reception/transmission). This handover process is also complicated by hand offs being made between different radio access technologies (RAT). Other approaches, to the extent that inter-system RAT is accommodated, are believed to be overly complicated (e.g., in Wideband Code Division Multiple Access (WCDMA)).

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with an access point (source node) that directs an access terminal (user equipment) to search for a target node, facilitated by transmitting information for accessing in a neighbor list. A handover request from the UE is predicated upon the UE determining that reception from the target node relative to the source node exceeds a criterion. Thereby, the source node can reduce the latency and connection failures by providing the information to access the target node and can selectively adjust to data traffic loading. In particular, the information transmitted about neighbor systems (target nodes) can advantageously accommodate a wide range of radio access technologies.

In one aspect, a method for inter-system handovers in a wireless communication system is provided wherein a source node transmits a neighbor list containing at least one parameter for connecting to a target node proximal to a source node. A criterion is also transmitted for a user equipment (UE) to determine when to pursue a handover to the target node. Then, the UE can be handed over to the target node with reduced latency or connection error.

In another aspect, at least one processor for inter-system handovers in a wireless communication system has a first module for transmitting a neighbor list from a source node containing at least one parameter for connecting to a target node proximal to a source node. A second module is for transmitting a criterion for a user equipment (UE) to determine when to pursue a handover to the target node. A third module is for handing over the UE to the target node with reduced latency or connection error.

In an additional aspect, a computer program product for inter-system handovers in a wireless communication system has a computer-readable medium that contains sets of codes for causing a computer to transmit a neighbor list from a source node containing at least one parameter for connecting to a target node proximal to a source node, to transmit a criterion for a user equipment (UE) to determine when to pursue a handover to the target node, and to hand over the UE to the target node with reduced latency or connection error.

In yet another aspect, an apparatus for inter-system handovers in a wireless communication system has a means for transmitting a neighbor list from a source node containing at least one parameter for connecting to a target node proximal to a source node, another means for transmitting a criterion for a user equipment (UE) to determine when to pursue a handover to the target node, and yet an additional means for handing over the UE to the target node with reduced latency or connection error.

In yet a further aspect, an apparatus for inter-system handovers in a wireless communication system has a computer-readable medium containing a data structure comprising a neighbor list from a source node containing at least one parameter for connecting to a target node proximal to a source node and containing a criterion for a user equipment (UE) to determine when to pursue a handover to the target node. A transmitter transmits the neighbor list and criterion. A communication channel to the target node facilitates handover of the UE to the target node with reduced latency or connection error.

In yet an additional aspect, a method for inter-system handovers in a wireless communication system includes receiving a neighbor list from a source node containing at least one parameter for connecting to a target node proximal to a source node. A criterion for user equipment (UE) is received to determine when to pursue a handover to the target node. Subsequently, handing over the UE to the target node is requested with reduced latency or connection error.

In yet another aspect, at least one processor for inter-system handovers in a wireless communication system has a first module for receiving a neighbor list from a source node containing at least one parameter for connecting to a target node proximal to a source node. A second module receives a criterion for a user equipment (UE) to determine when to pursue a handover to the target node. A third module for requesting handing over the UE to the target node with reduced latency or connection error.

In an additional aspect, a computer program product for inter-system handovers in a wireless communication system has a computer-readable medium containing sets of codes for causing a computer to receive a neighbor list from a source node containing at least one parameter for connecting to a target node proximal to a source node, to receive a criterion for a user equipment (UE) to determine when to pursue a handover to the target node, and to request handing over the UE to the target node with reduced latency or connection error.

In yet a further aspect, an apparatus for inter-system handovers in a wireless communication system has means for receiving a neighbor list from a source node containing at least one parameter for connecting to a target node proximal to a source node, another means for receiving a criterion for a user equipment (UE) to determine when to pursue a handover to the target node, and an additional means for requesting handing over the UE to the target node with reduced latency or connection error.

In an additional aspect, an apparatus for inter-system handovers in a wireless communication system has a computer-readable medium for receiving a data structure comprising a neighbor list from a source node containing at least one parameter for connecting to a target node proximal to a source node and containing a criterion for a user equipment (UE) to determine when to pursue a handover to the target node. A receiver receives the neighbor list and criterion. In addition, a transmitter requests handover to the target node with reduced latency or connection error.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
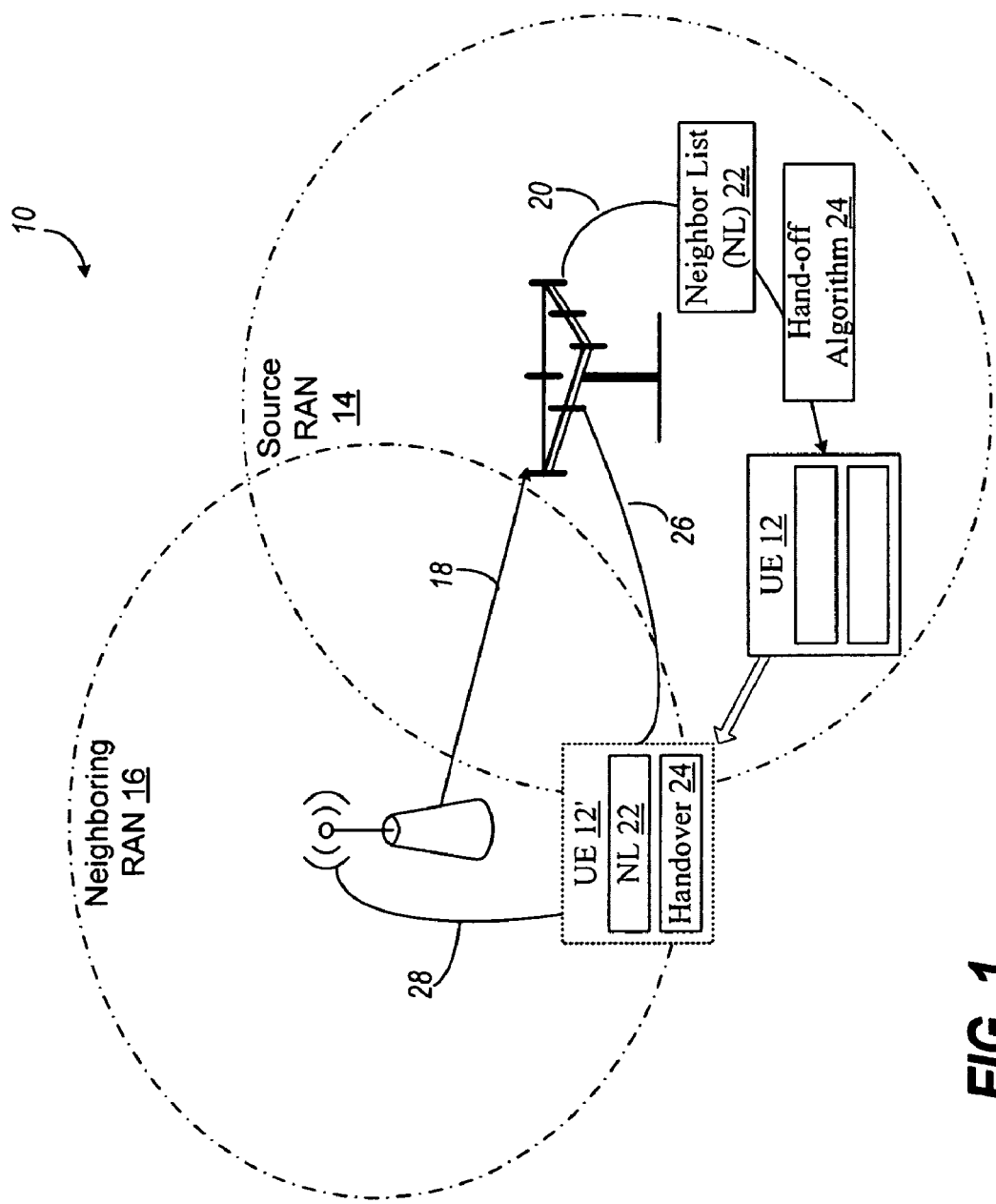
FIG. 1 illustrates a block diagram of a wireless communication system of a user equipment (UE) moving from a coverage area of source radio access network (RAN) to a neighboring RAN warranting an inter-system handover.

An inter-system handover system for a wireless communication system supports hand-down and hand-up of a user equipment (UE) to different radio access technologies (e.g., 3GPP LTE (Third Generation Partnership Project Long Term Evolution, GSM (Global System for Mobile Communications), WCDMA (Wideband Code Division Multiple Access)/High Speed Packet Access variants (e.g., HSxPA/ HSPA+), 1× Evolution-Data Only (1×/DO), Ultra Mobile Broadband (UMB), Worldwide Interoperability for Microwave Access (WiMAX), etc.), including synchronous and asynchronous systems. Latency and handover connection failures are reduced by an access node (nodeB) broadcasting information about neighboring systems (targets) when the UE reception (RX) capability is both inside or outside the reception range of the target. A single RX chain is sufficient, although transitioning between a wireless wide area network (WWAN) to a wireless local area network (WLAN) may advantageously benefit from simultaneous operation on two Rx chains. Optimized list of neighboring RAT systems (targets) are broadcast from the network, including measurement parameters and reporting instructions. Thereby, UE-driven reporting minimizes latencies. UE reports other-system searches to network only if needed for a handover. In addition, handover requests can be bundled with other-system measurement information, if necessary, for additional efficiencies.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a server and the server can be a component. One or more components may reside within a process or thread of execution and a component may be localized on one computer or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more versions may be implemented as a method, apparatus, or article of manufacture using standard programming or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Various aspects will be presented in terms of systems that may include a number of components, modules, and the like. It is to be understood and appreciated that the various systems may include additional components, modules, etc., or may not include all of the components, modules, etc., discussed in connection with the figures. A combination of these approaches may also be used. The various aspects disclosed herein can be performed on electrical devices including devices that utilize touch screen display technologies or mouse-and-keyboard type interfaces. Examples of such devices include computers (desktop and mobile), smart phones, personal digital assistants (PDAs), and other electronic devices both wired and wireless.

Referring initially to FIG. 1, in one aspect, a wireless communication system 10 enhances data traffic loading or reduces latency/connection errors during handover of user equipment (UE) 12 between a source radio access network (RAN) 14 and a neighboring RAN 16. In particular, the source RAN 14 either requests over a network connection or receives broadcast data, depicted at 18, parameters for the neighboring RAN 16. Examples of such parameters include information for handover between different radio access technologies (inter-RAT) such as system type, center frequency, etc. The source RAN 14 sends a Neighbor List (NL) 22 to prompt, or to at least provision, the UE 12 for searching for another system for connection. The source RAN 14 also sends at least one criterion to enable a hand-off algorithm 24 for the UE 12 to execute. This algorithm 24 allows the source RAN 14 to dictate conditions under which the UE 12 should seek a handover. This algorithm 24 can reflect data traffic load on the source RAN 14 to avoid congestion. This algorithm 24 can distribute processing loads to the UE 12 as well reducing measurement-reporting requirements that would otherwise be required for the source RAN 14 to determine when a handover is warranted.

Figure 2:
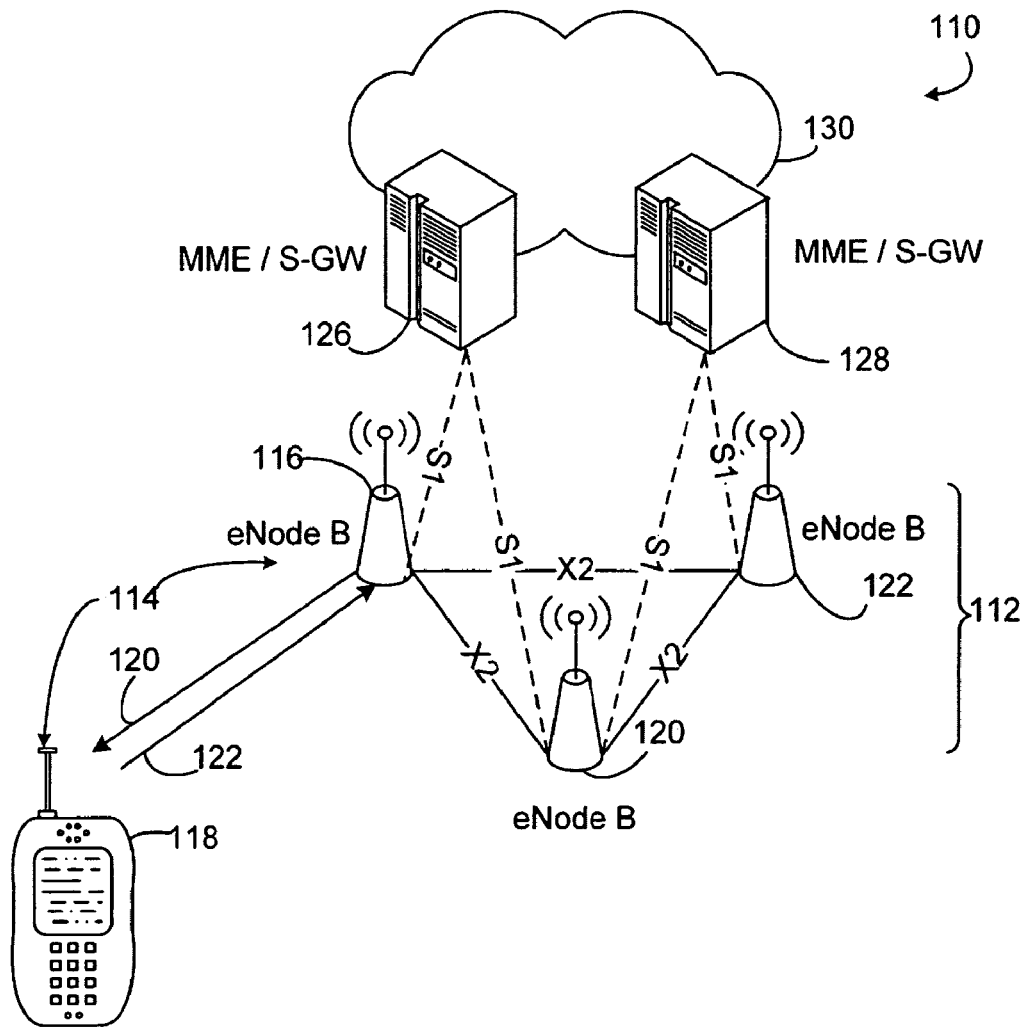
FIG. 2 illustrates a block diagram of an illustrative source RAN of FIG. 1.

Referring to FIG. 2, in another aspect, a communication system 110 includes an evolved Universal Mobile Telecommunications System (UMTS) Terrestrial Radio Access Network (E-UTRAN) 112 that incorporates an inter-system handover system 114 between at last one radio access network (RAN), depicted as an evolved base node (eNode B) 116 and a user equipment (UE) device 118. Another in-range eNode B 120 for multiple input multiple output (MIMO) communications is depicted as being available for a handover. Yet a third eNode B 122 is depicted as being out of range of UE device 118.

The eNode Bs 116, 120, 122 provide an UMTS Terrestrial Radio Access (E-UTRA) user plane and control plane (RRC) protocol terminations towards the UE 118. The user plane can comprise of 3GPP (3rd Generation Partnership Project) Packet Data Convergence Protocol (PDCP), radio link control (RLC), medium access control (MAC) and physical layer control (PHY). The eNode Bs 116, 120, 122 are interconnected with each other by means of X2 interface ("X2"). The eNode Bs 116, 120, 122 are also connected by means of an S1 interface ("S1") to an EPC (Evolved Packet Core), more specifically to mobility management entities/serving gateways (MME/S-GW) 126, 128 connected to a data packet network 130. The S1 interface supports a many-to-many relation between MMEs/S-GW 126, 128 and eNode Bs 116, 120, 122.

The eNode Bs 116, 120, 122 hosts the following functions: radio resource management; radio bearer control; radio admission control; connection mobility control; dynamic allocation of resources to UEs in both uplink and downlink (scheduling); IP header compression and encryption of user data stream; selection of an MME at UE attachment; routing of user plane data towards serving gateway; scheduling and transmission of paging messages (originated from the MME); scheduling and transmission of broadcast information; and measurement reporting configuration for mobility and scheduling.

The MME hosts the following functions: distribution of paging messages to the eNodes Bs 116, 120, 122; security control; idle state mobility control; System Architecture Evolution (SAE) bearer control; ciphering and integrity protection of Non-Access Stratum (NAS) signaling. The Serving Gateway hosts the following functions termination of U-plane packets for paging reasons and switching of U-plane for support of UE mobility.

Figure 3:
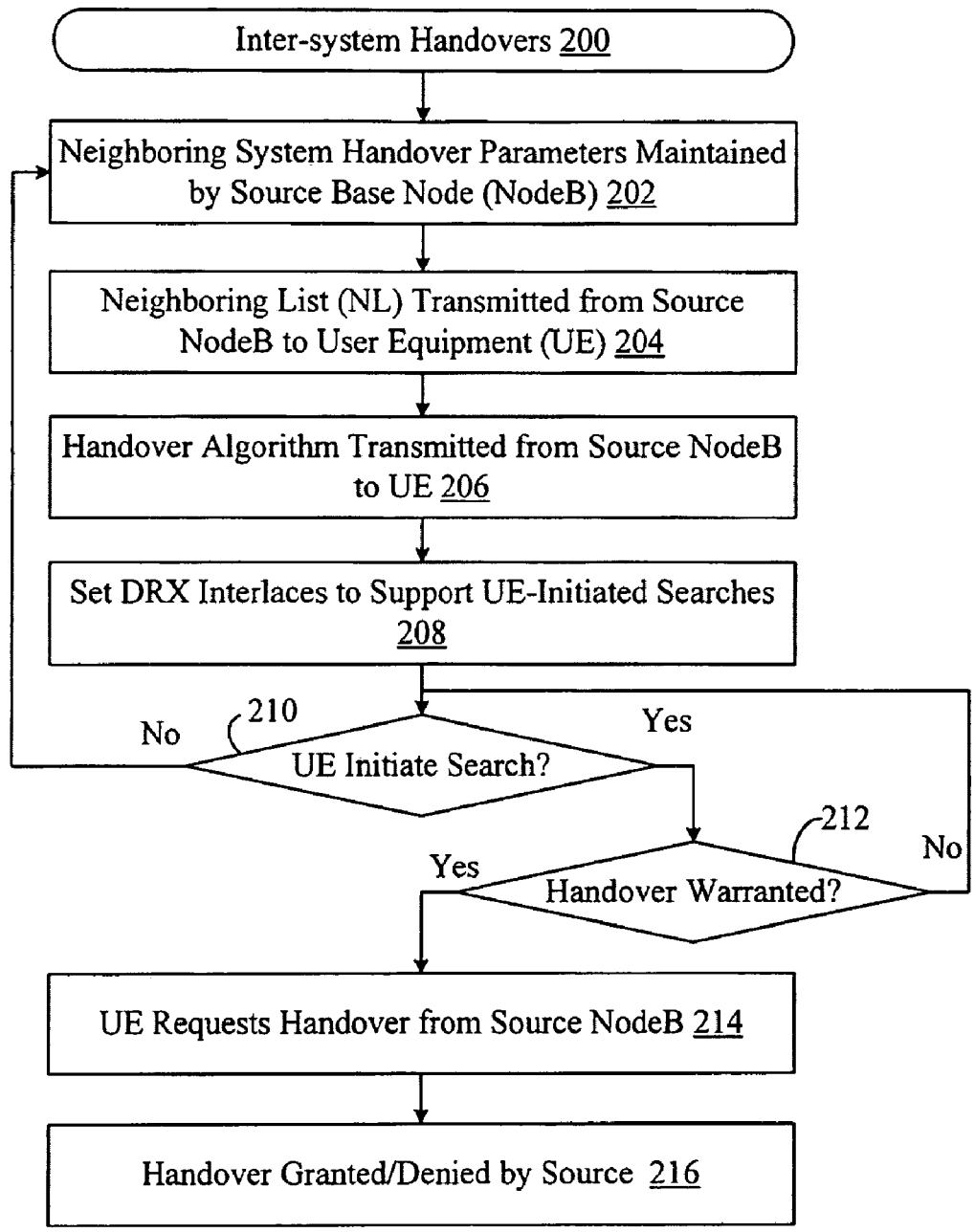
FIG. 3 illustrates a flow diagram for a methodology for inter-system handovers performed by the wireless communication system of FIG. 1.

In FIG. 3, a methodology 200 for inter-system handovers begins with a source base node (NodeB) maintaining parameters necessary for handover to a neighboring system (block 202). The source NodeB transmits neighbor list (NL) to a UE (block 204). This NL can specify a type of RAT for each target (e.g., GSM, WCDMA, HSxPA, LTE, 1x/DO, UMB, WiMAX, etc.), the center frequency, system bandwidth, reference time difference between source and each target, or other system specific information. For instance, the latter can include color code and pseudo noise (PN) offset, cell ID. As another example, the latter can also include center frequency plus scrambling code for WCDMA/HSxPA. This transmission can be unicast in some instances; however, in the exemplary methodology this NL may be broadcast to a population of UEs. A handover algorithm is thus transmitted from the source NodeB to the UE in block 206. In some instances, broadcast of the NL alone is sufficient to prompt UEs to begin searching for the target NodeBs contained in the NL. In other instances, the algorithm initially dictates conditions/criteria necessary as a prerequisite for beginning to search, such as energy per symbol to interference density ratio (Es/Io) measured from the source NodeB. Alternatively or in addition, the algorithm dictates conditions under which the UE requests a handover.

The UEs typically have sufficient spare interlaces to perform required measurements. The source NodeB can maintain a desired number of interlaces (DRX patterns) for other system measurements for each system type (block 208). Once a determination is made that the UE should initiate search for another system in block 210 (e.g., responding to receipt of NL, responding to both NL and an algorithm/search criterion, etc.), then the handover algorithm is executed to determine whether handover is warranted (block 212). Then the UE requests the handover (block 214), which the Source NodeB considers for granting or denying (block 216). For instance, the handover algorithm can alert the source NodeB of the option to handover in order to balance loading. If the measurements indicate that a handover must be made to maintain connection, then this may result in an increased emphasis on granting.

Figure 4:
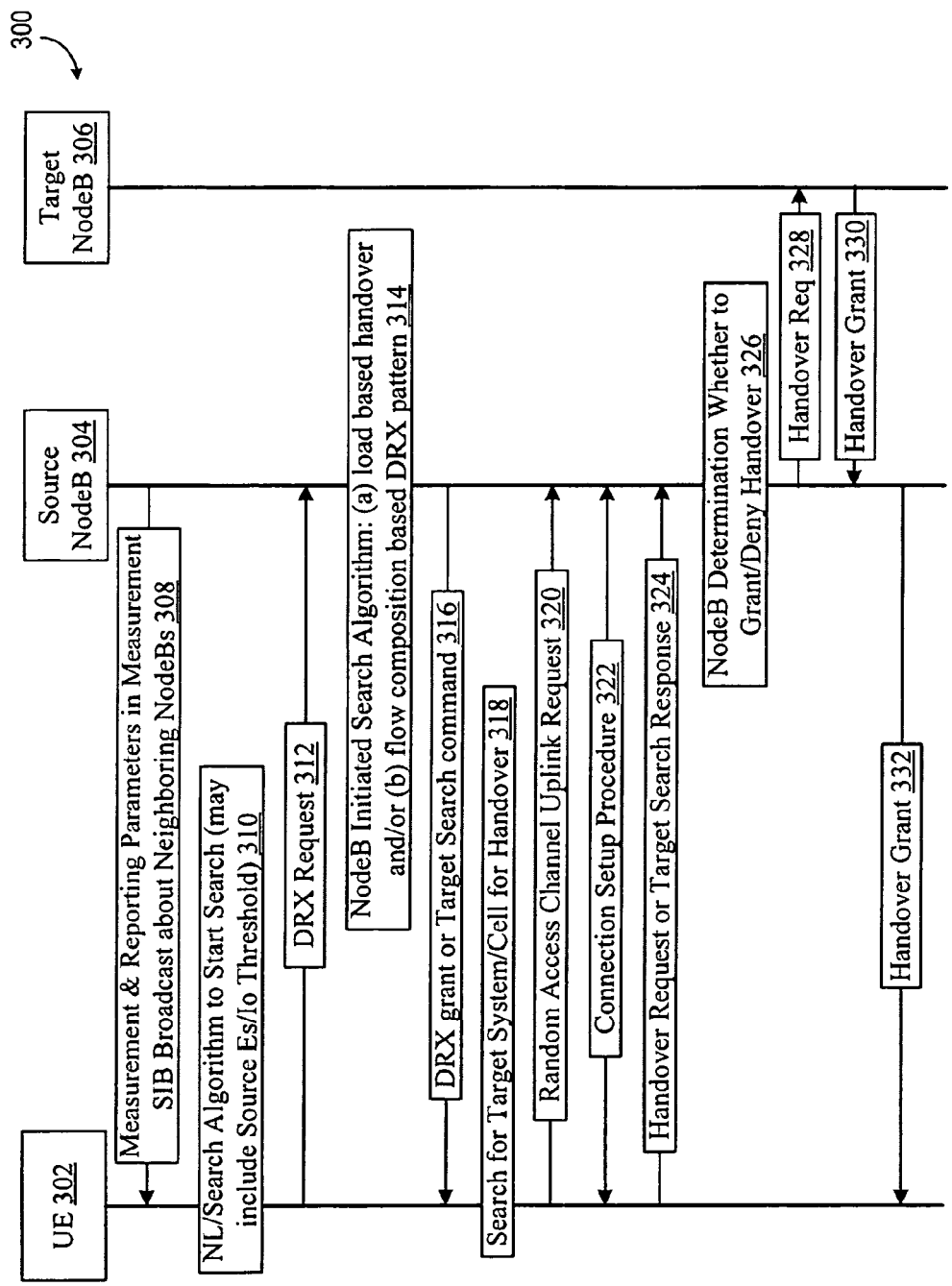
FIG. 4 illustrates a timing diagram of the wireless communication system of FIG. 1 with the UE in an active state being set up by a source base access node (nodeB) for inter-system handover.

In FIG. 4, a timing diagram for a methodology 300 for communications between an active UE 302 with a Source NodeB 304 is depicted that culminate in a handover to a Target NodeB 306. In block 308, the Source NodeB 304 broadcasts a system information block (SIB) that is applicable to UE 302 both in idle and in active states. The measurement and reporting parameters in the SIB can be dynamically changed by the network, such as being periodically transmitted on the broadcast control channel (BCCH) to reflect availability of target nodes or local loading conditions. In block 310, the UE 302 extracts the NL and search algorithm from the SIB in order to determine when to start searching for another system. Receipt of the NL may suffice to initiate the search. For example, the Source NodeB 304 may refrain from broadcasting an NL until loading conditions are such that it is desired to know which UEs 302 could connect with target node. Alternatively, the start algorithm could require a further determination that the received signal strength from the source NodeB 304 has dropped below a certain threshold.

In block 312, in some instances the UE 302 can request discontinuous reception (DRX) in order to accommodate searching for the target system(s); however is should be appreciated with the benefit of the present disclosure that searching for the other system may not require such a request. In response in block 314, the source NodeB 304 can execute an algorithm for (a) load based handover or (b) flow composition based DRX pattern. Then in block 316, the corresponding message is sent from the Source NodeB 304 to the UE 302. If the latter, then a target system search command is sent that includes target system information and response parameters (TVM, position location, UE international measurements, etc.). If the latter, a DRX pattern is granted. In block 318, the UE 302 begins search for a target system/cell for handover.

In block 320, for instances in which the UE 302 is in a continuous packet connectivity mode, the UE 302 can access the random access channel (RACH), resulting in a connection setup procedure in block 322 between the UE 302 and the source NodeB 304.

In block 324, the UE 302 responds with a handover request or a target search response. Measurements can be bundled up with the response including the TVM for the queue size of a target nodeB 306 or a received power measurement (e.g., Es/Io, RSSI, etc.).

In block 326, the source NodeB 304 makes a determination whether to grant or deny the handover. If granted, in block 328 the source NodeB 304 can communicate with the target nodeB 306 using the target information from the UE 302. The target nodeB 306 grants the handover in block 330, which can include target system information for use by the UE 302. The source NodeB 304 responds for relaying the handover grant to the UE 302 in block 332, which can include target system information if applicable. Thereby latency and connection failures are reduced by facilitating the handover.

Figure 5:
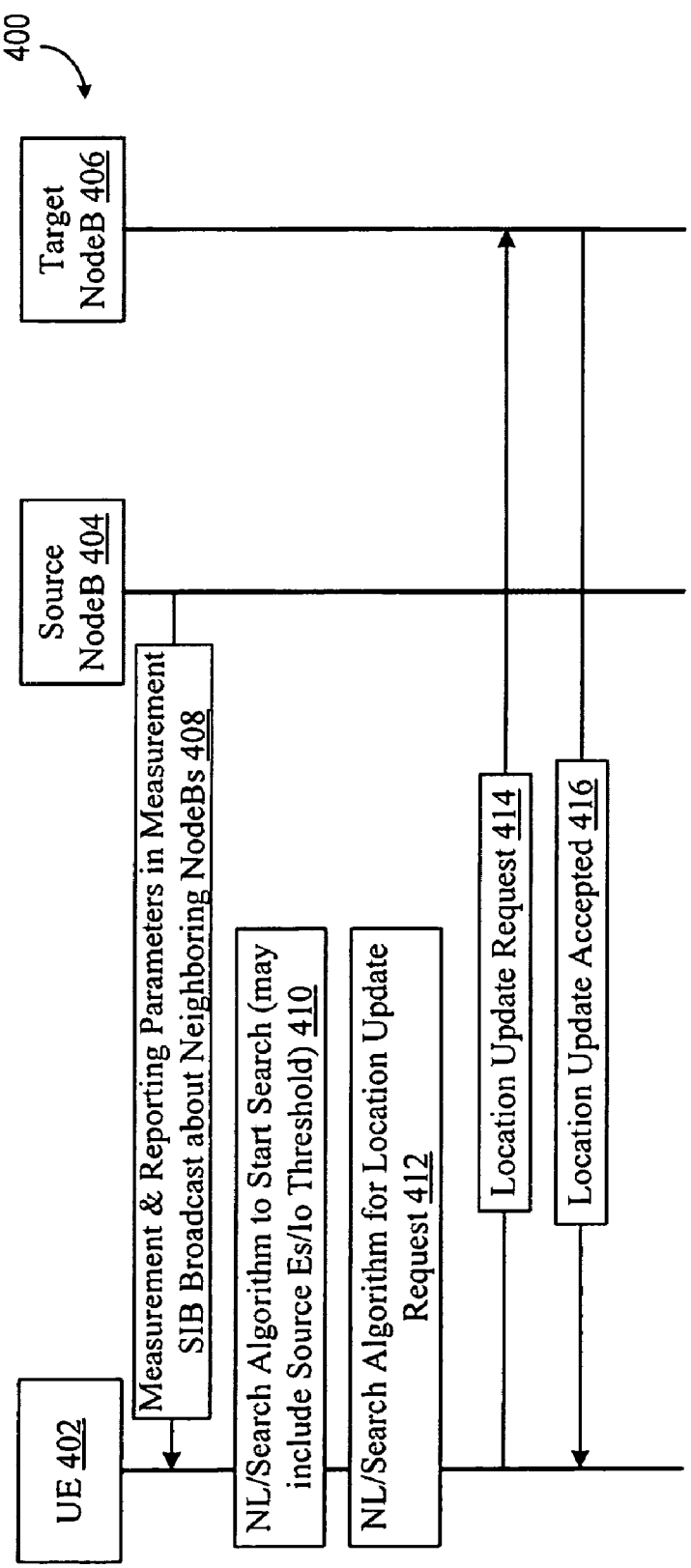
FIG. 5 illustrates a timing diagram of the wireless communication system of FIG. 1 with the UE in an idle state being set up by the nodeB for inter-system handover.

In FIG. 5, a methodology for 400 is depicted for a UE 402 that is in idle state with a source NodeB 404 to perform a handover to a target nodeB 406. In block 408, the source NodeB 404 transmits measurement and reporting parameters in a measurement SIB, whose broadcast includes information about neighboring NodeB (i.e., target NodeB 406). In block 410, the UE 402 responds to the NL and the search algorithm received by starting to search for the target nodeB 406. This search can be predicated upon the received signal strength (e.g., Es/Io) from the source nodeB 404 dropping below a predetermined threshold. In block 412, a further aspect of the NL/search algorithm is performed to determine when sufficient connectivity has been sensed to warrant a location update request. When this is determined, then in block 414, the UE 402 makes a location update request to the target nodeB 406, which in turn responds with a location update accepted in block 416.

Figure 6:
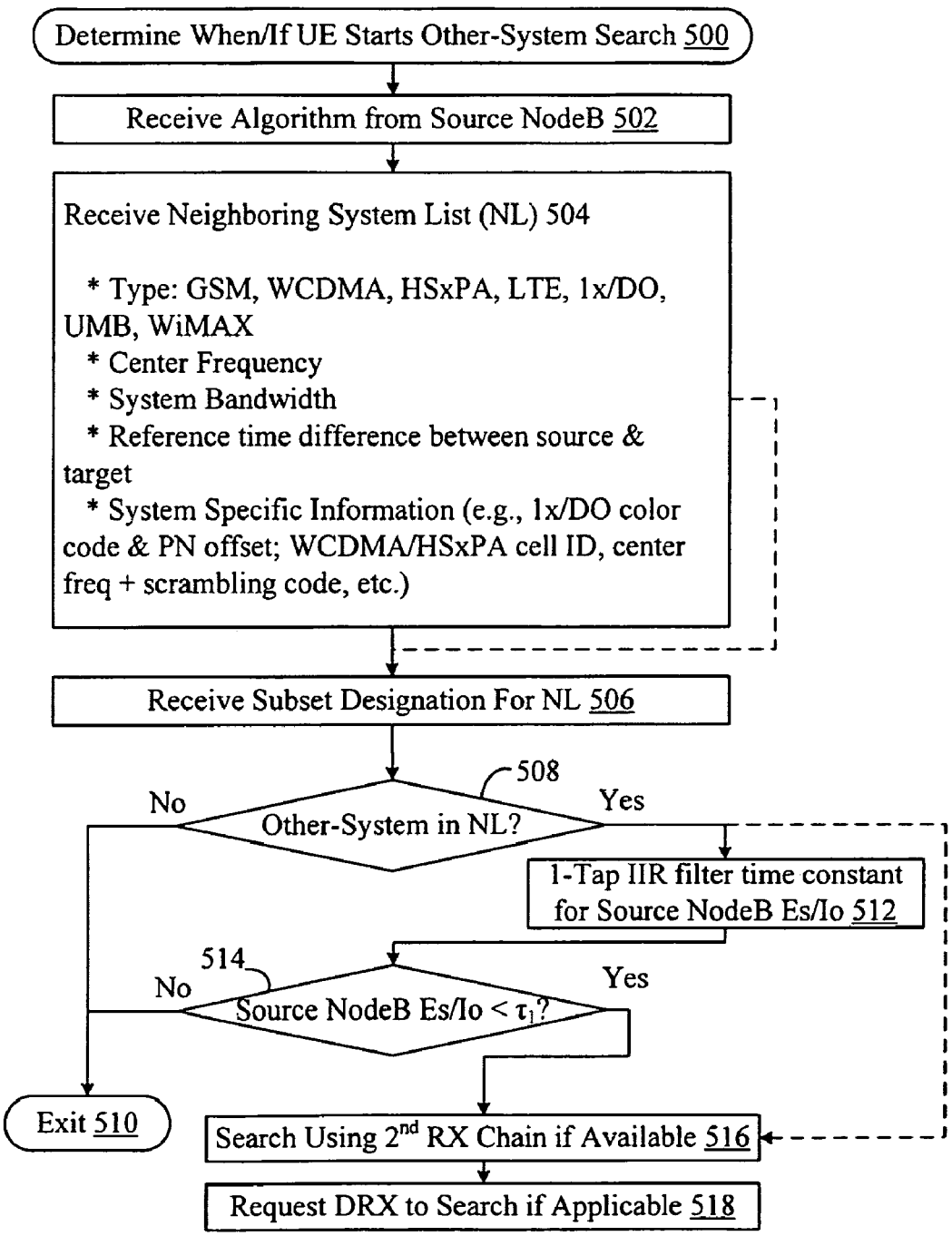
FIG. 6 illustrates a flow diagram of a methodology set up by the NodeB and performed by the UE of FIG. 1 for determining when or if to start other-system search in preparation for inter-system handover.

In FIG. 6, a methodology 500 for determining when or if the UE is to start another-system search as mentioned above begins with receiving the algorithm from the source NodeB in block 502. In block 504, the list of neighboring systems is received, which in the illustrative depiction can be a type of RAT system (e.g., GSM, WCDMA, HSxPA, LTE, 1x/DO, UMB, WiMAX). It can include center frequency, system bandwidth, reference time difference between source and target, or system specific information (e.g., 1x/DO color code and PN offset; WCDMA/HSxPA cell ID, center frequency and scrambling code, etc.). In block 506, the source NodeB may have designated a subset of the NL for searching and not the entire list. In block 508, a determination is made as to whether another system is contained in the NL for targeting. If not, then the methodology 500 exits at block 510 until an applicable NL is received.

If a target system was found in block 508, then, if required, a one-tap Infinite Impulse Response (IIR) filter time constant for source NodeB Es/Io is performed in block 512. A determination is then made in block 514 whether the filtered measurement of Es/Io for the source NodeB has fallen below a specified threshold ("$\tau_1$"). If so in block 514 or if receipt of NL was sufficient for searching in block 508, then a search is performed using the second RX chain if available in block 516. However, in many instances, due to cosmetic and cost considerations, a secondary Rx chain sensitivity may be lower than a primary Rx chain. The methodology thus accommodates this by assuming that a single radio VCC for inter-RAT handover (i.e., independently tunable RX chains or simultaneous dual system reception/processing is not presumed). It should be appreciated that having dual RX chains does enhance handover, for example, by being able to receive contiguous ten frames of a GSM system whose capture allows quicker GSM system acquisition. In block 518, it may be necessary for the UE to request DRX in order to facilitate searching.

Figure 7:
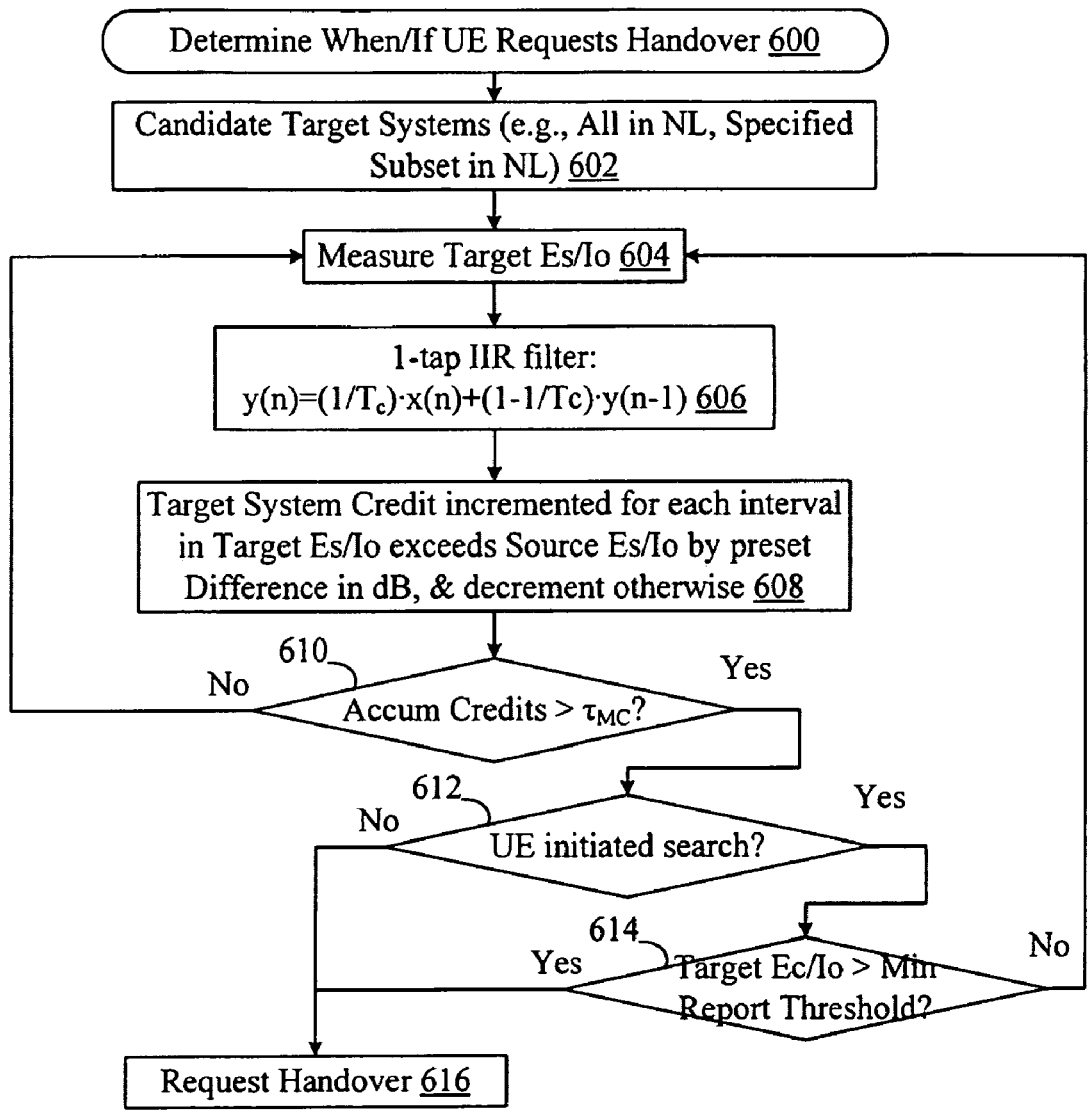
FIG. 7 illustrates a flow diagram of a methodology set up by the NodeB and performed by the UE of FIG. 1 for determining when or if the UE requests handover.

In FIG. 7, a methodology 600 for determining when or if a UE requests a handover is performed after performing the search such as depicted above in FIG. 6. This list of one or more target systems can be limited to those specified in a subset of the NL by the source NodeB, depicted in block 602. For clarity, measurement of one target nodeB is depicted, although it should be appreciated with the benefit of the present disclosure that multiple target nodeBs may be monitored for possible handover. In block 604, a measure representative of target nodeB received power is performed, such as Es/Io. This measure is low pass filtered in block 606, which in the illustrative depiction utilizes a one-tap IIR filter "$y(n)=(1/T_c) \cdot x(n)+(1-1/T_c) \cdot y(n-1)$". In block 608, a calculation is made as to whether this signal over time appears to be strong enough (e.g., minimum credits). In the illustrative depiction, a credit is incremented for each interval in which the target Es/Io power level (dB) exceeds the source Es/Io by some preset difference and otherwise decrements the credit. In block 610, a determination is made as to whether the accumulated credits exceed a minimum credits threshold ("$\tau_{MC}$"). If so, a further determination is made as to whether this result was arrived at based upon a UE-initiated search in block 612, and if so, a further determination is made if the target energy per chip to interference density ratio (Ec/Io) exceeds a minimum report threshold specified by the source NodeB in block 614. If so, or if not UE initiated search in block 612, then the UE requests a handover in block 616.

Figure 8:
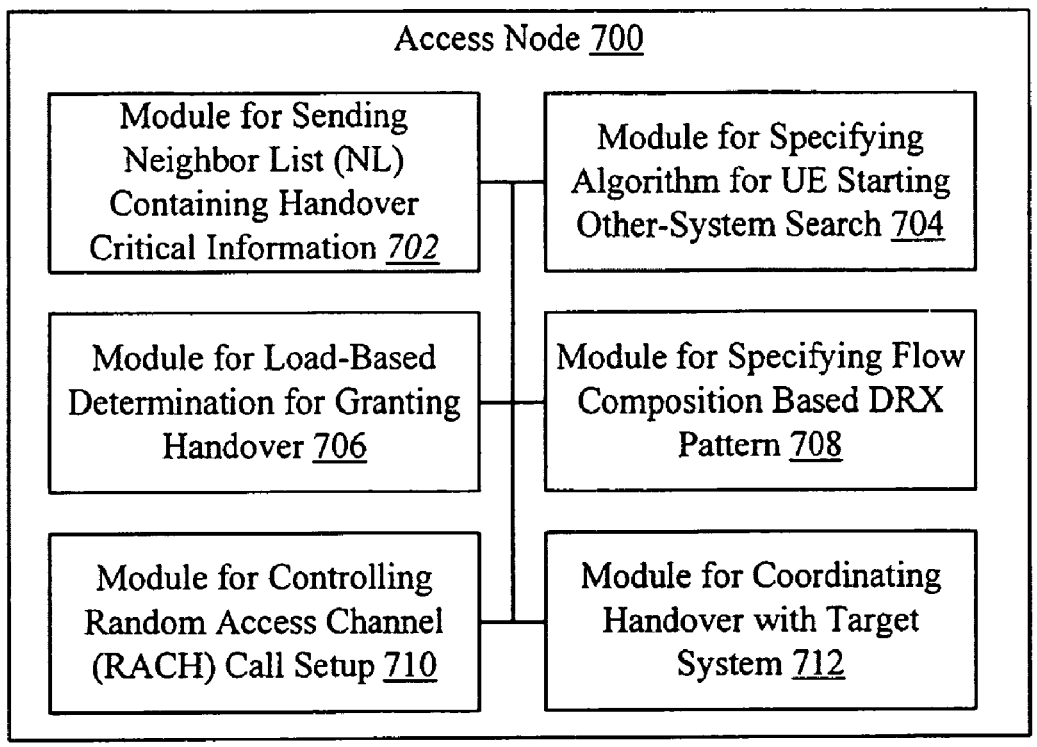
FIG. 8 illustrates a block diagram of an access node (NodeB) having modules configured to cause a computer to perform the functions for inter-system handover.

In FIG. 8, in another aspect, an access node 700 includes modules that provide a means to cause a computer to participate in or to perform the methodologies of FIGS. 3-7. A module 702 is provided for sending neighbor list (NL) containing handover critical information. A module 704 is provided for specifying algorithm for UE starting other-system search. A module 706 is provided for load-based determination for granting handover. A module 708 is provided for specifying flow composition based DRX pattern. A module 710 is provided for controlling random access channel (RACH) call setup. A module 712 is provided for coordinating handover with a target system.

Figure 9:
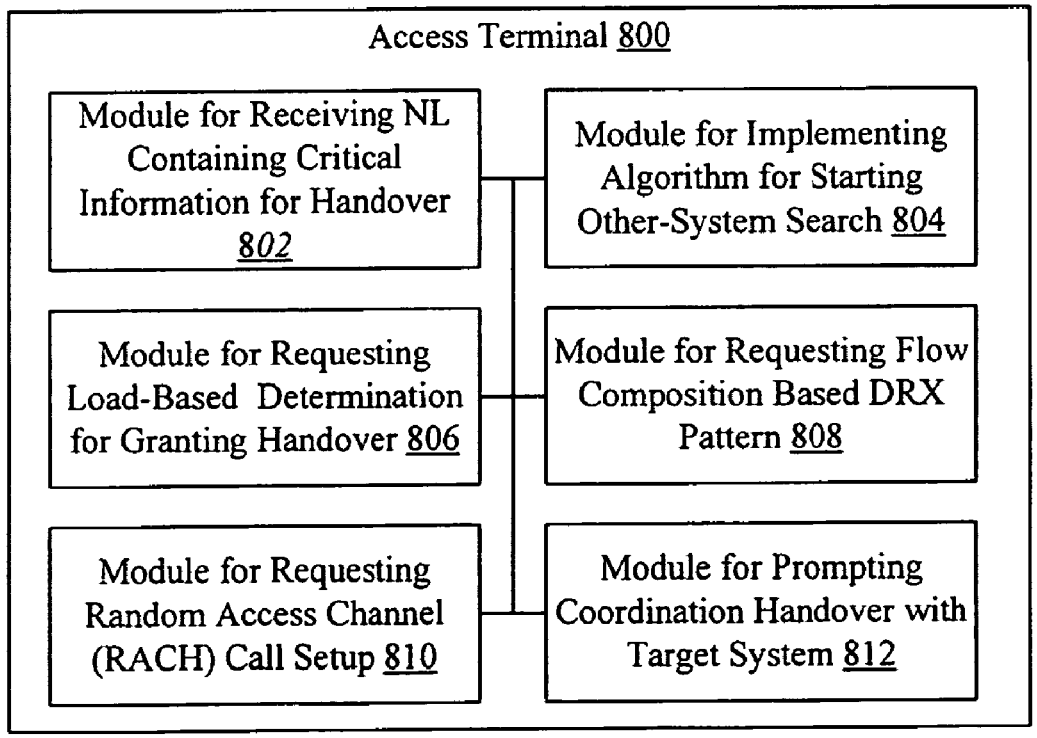
FIG. 9 illustrates a block diagram of an access terminal (UE) having modules configured to cause a computer to perform the functions for inter-system handover.

In FIG. 9, in another aspect, an access terminal 800 includes modules that provide a means to cause a computer to participate in or to perform the methodologies of FIGS. 3-8. A module 802 is provided for receiving neighbor list (NL) containing handover critical information. A module 804 is provided for implementing an algorithm for UE starting other-system search. A module 806 is provided for requesting load-based determination for granting handover. A module 808 is provided for requesting flow composition based DRX pattern. A module 810 is provided for requesting random access channel (RACH) call setup. A module 812 is provided for prompting coordination of a handover with a target system.

Figure 10:
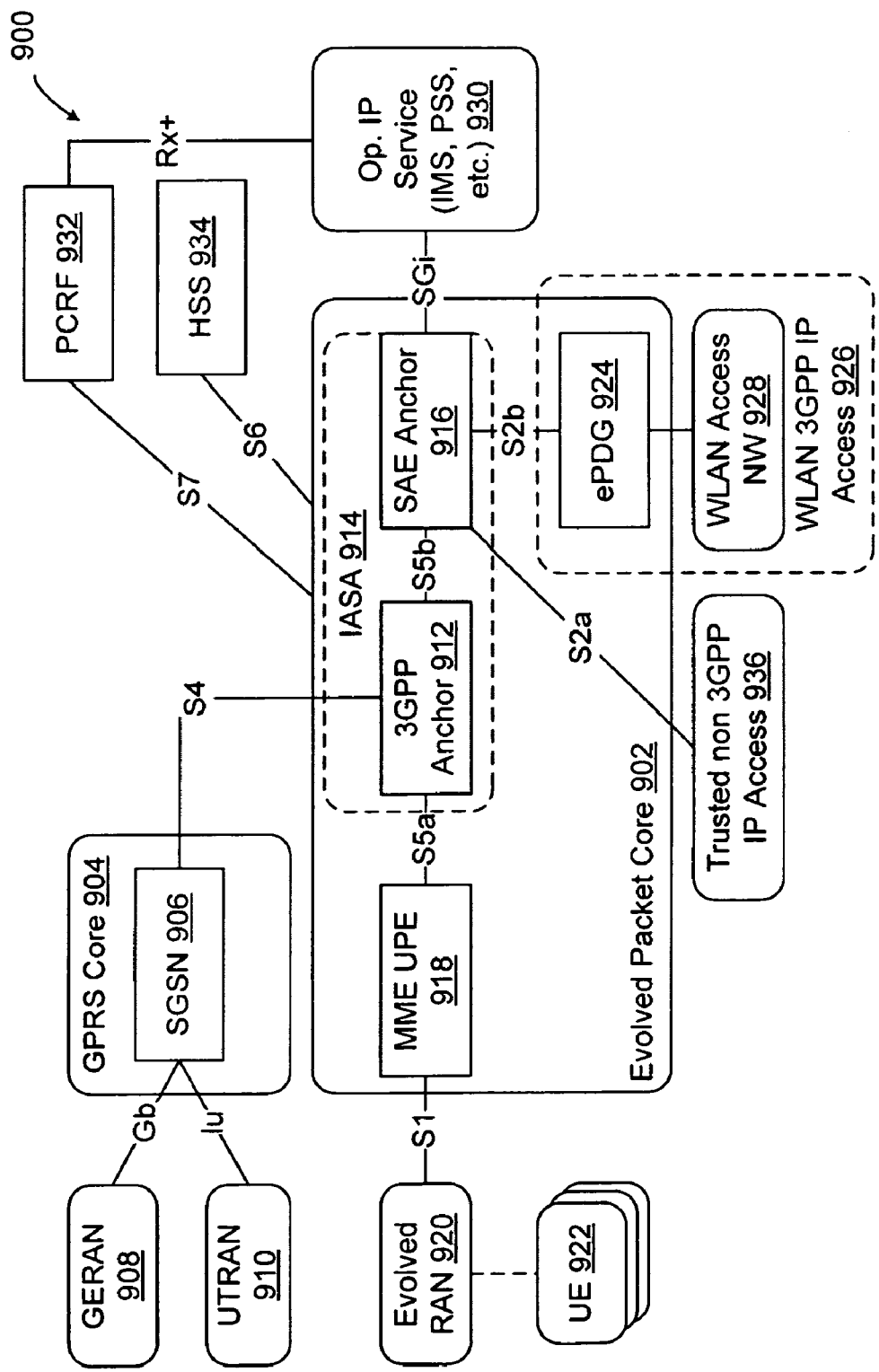
FIG. 10 illustrates a block diagram of a communication system enhanced to support inter-system handovers.

In FIG. 10, in another aspect, a communication system 900 that can encompass the communication system 10 of FIG. 1 includes support for interfacing an evolved packet core 902 via an interface S4 with a legacy General Packet Radio Service (GPRS) core 904, whose Serving GPRS Support Node (SGSN) 906 is interfaced in turn by a Gb interface to a Global System for Mobile Communications (GSM)/Edge Radio Access Network (GERAN) 908 and via an Iu interface to a UTRAN 910. The S4 provides the user plane with related control and mobility support between GPRS Core 904 and a 3GPP Anchor 912 of an Inter Access Stratum Anchor (IASA) 914 and is based on a Gn reference point as defined between SGSN 906 and Gateway GPRS Serving/Support Node (GGSN) (not shown). The IASA 914 also includes a system architecture evolved (SAE) anchor 916 interfaced to the 3GPP anchor 912 by an S5b interface that provides the user plane with related control and mobility support. The 3GPP anchor 912 communicates with an MME UPE 918 via interface S5a. Mobility Management Entity (MME) pertains to distribution of paging messages to the eNBs and User Plane Entity (UPE) pertains to IP header compression and encryption of user data streams, termination of U-plane packets for paging reasons, and switching of U-plane for support of UE mobility. The MME UPE 918 communicates via interface 51 to an evolved RAN 920 for wirelessly communicating with UE devices 922.

An S2b interface provides the user plane with related control and mobility support between the SAE Anchor 916 and an evolved Packet Data Gateway (ePDG) 924 of a wireless local access network (WLAN) 3GPP IP Access component 926 that also includes a WLAN Access network (NW) 928. An SGi interface is the reference point between the Inter AS Anchor 916 and a packet data network 930. Packet data network 930 may be an operator external public or private packet data network or an intra operator packet data network, e.g., for provision of IP Multimedia Subsystem (IMS) services. This SGi reference point corresponds to Gi and Wi functionalities and supports any 3GPP and non-3GPP access systems. An Rx+ interface provides communication between the packet data network 930 and a policy and charging rules function (PCRF) 932, which in turn communicates via an S7 interface to the evolved packet core 902. The S7 interface provides transfer of (QoS) policy and charging rules from PCRF 932 to Policy and Charging Enforcement Point (PCEP) (not shown). An S6 interface (i.e., AAA interface) enables transfer of subscription and authentication data for authenticating/authorizing user access by interfacing the evolved packet core 902 to a home subscriber service (HSS) 934. An S2a interface provides the user plane with related control and mobility support between a trusted non-3GPP IP access 936 and the SAE Anchor 916.

It should be appreciated that wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out, single-in-multiple-out (SIMO) or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min \{N_T, N_R\}$. Each of the $N_S$ independent channels corresponds to a dimension. The MIMO system can provide improved performance (e.g., higher throughput or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beam forming gain on the forward link when multiple antennas are available at the access point.

Figure 11:
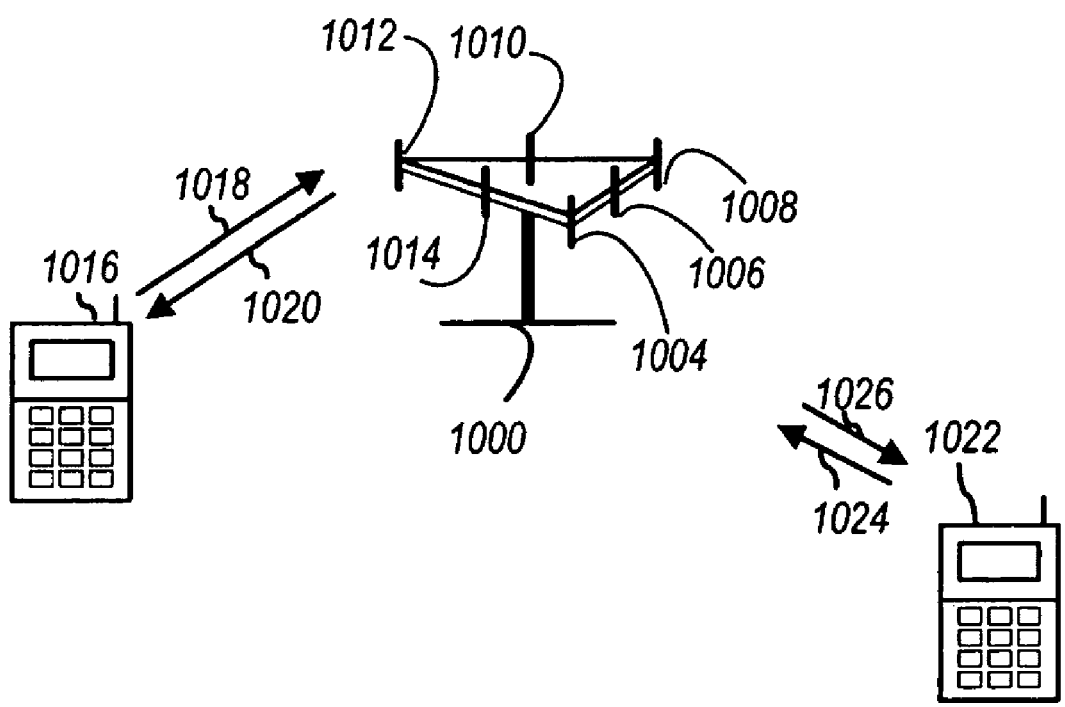
FIG. 11 illustrates a diagram of a multiple access wireless communication system according to one aspect for supporting flexible DRX.

Referring to FIG. 11, a multiple access wireless communication system according to one aspect is illustrated. An access point 1000 (AP) includes multiple antenna groups, one including 1004 and 1006, another including 1008 and 1010, and an additional including 1012 and 1014. In FIG. 11, only two antennas are shown for each antenna group, however, more or fewer antennas may be utilized for each antenna group. Access terminal 1016 (AT) is in communication with antennas 1012 and 1014, where antennas 1012 and 1014 transmit information to access terminal 1016 over forward link 1020 and receive information from access terminal 1016 over reverse link 1018. Access terminal 1022 is in communication with antennas 1006 and 1008, where antennas 1006 and 1008 transmit information to access terminal 1022 over forward link 1026 and receive information from access terminal 1022 over reverse link 1024. In a FDD system, communication links 1018, 1020, 1024 and 1026 may use different frequency for communication. For example, forward link 1020 may use a different frequency then that used by reverse link 1018.

Each group of antennas or the area in which they are designed to communicate is often referred to as a sector of the access point. In this aspect, antenna groups each are designed to communicate to access terminals in a sector, of the areas covered by access point 1000.

In communication over forward links 1020 and 1026, the transmitting antennas of access point 1000 utilize beam forming in order to improve the signal-to-noise ratio of forward links for the different access terminals 1016 and 1024. In addition, an access point using beam forming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 12:
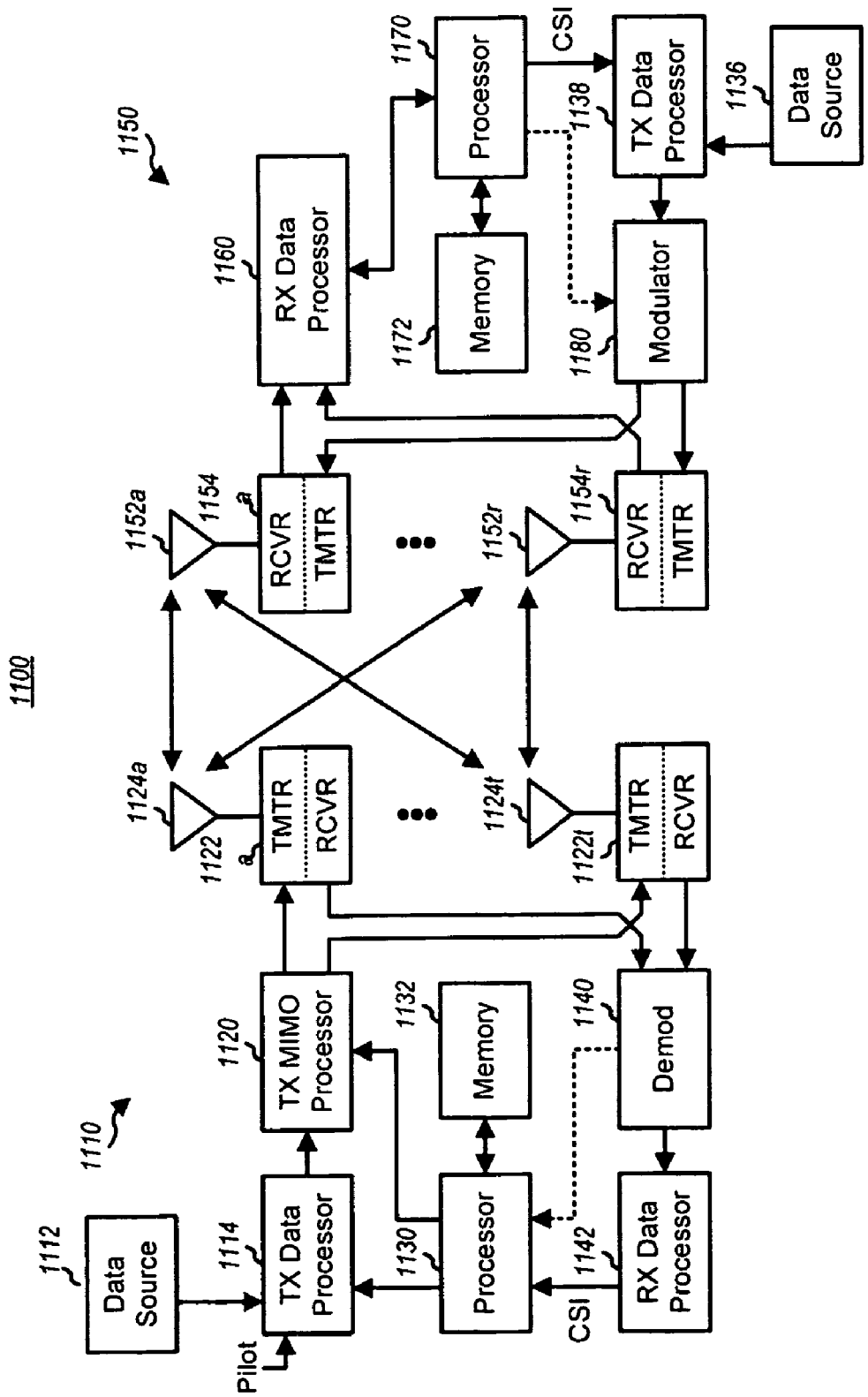
FIG. 12 illustrates a schematic block diagram of a communication system for supporting flexible DRX.

FIG. 12 is a block diagram of an aspect of a transmitter system 1110 (also known as the access point) and a receiver system 1150 (also known as access terminal) in a MIMO system 1100. At the transmitter system 1110, traffic data for a number of data streams is provided from a data source 1112 to a transmit (TX) data processor 1114.

In an aspect, each data stream is transmitted over a respective transmit antenna. TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1130.

The modulation symbols for all data streams are then provided to a TX MIMO processor 1120, which may further process the modulation symbols (e.g., for OFDM). TX MIMO processor 1120 then provides $N_T$ modulation symbol streams to $N_T$ transmitters (TMTR) 1122a through 1122t. In certain implementations, TX MIMO processor 1120 applies beam-forming weights to the symbols of the data streams and to the antenna from which the symbol is being transmitted.

Each transmitter 1122 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 1122a through 1122t are then transmitted from $N_T$ antennas 1124a through 1124t, respectively.

At receiver system 1150, the transmitted modulated signals are received by $N_R$ antennas 1152a through 1152r and the received signal from each antenna 1152 is provided to a respective receiver (RCVR) 1154a through 1154r. Each receiver 1154 conditions (e.g., filters, amplifies, and downconverts) a respective received signal, digitizes the conditioned signal to provide samples, and further processes the samples to provide a corresponding "received" symbol stream.

An RX data processor 1160 then receives and processes the $N_R$ received symbol streams from $N_R$ receivers 1154 based on a particular receiver processing technique to provide $N_T$ "detected" symbol streams. The RX data processor 1160 then demodulates, deinterleaves, and decodes each detected symbol stream to recover the traffic data for the data stream. The processing by RX data processor 1160 is complementary to that performed by TX MIMO processor 1120 and TX data processor 1114 at transmitter system 1110.

A processor 1170 periodically determines which pre-coding matrix to use (discussed below). Processor 1170 formulates a reverse link message comprising a matrix index portion and a rank value portion.

The reverse link message may comprise various types of information regarding the communication link or the received data stream. The reverse link message is then processed by a TX data processor 1138, which also receives traffic data for a number of data streams from a data source 1136, modulated by a modulator 1180, conditioned by transmitters 1154a through 1154r, and transmitted back to transmitter system 1110.

At transmitter system 1110, the modulated signals from receiver system 1150 are received by antennas 1124, conditioned by receivers 1122, demodulated by a demodulator 1140, and processed by a RX data processor 1142 to extract the reserve link message transmitted by the receiver system 1150. Processor 1130 then determines which pre-coding matrix to use for determining the beam forming weights then processes the extracted message.

In an aspect, logical channels are classified into Control Channels and Traffic Channels. Logical Control Channels comprises Broadcast Control Channel (BCCH), which is DL channel for broadcasting system control information. Paging Control Channel (PCCH), which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In an aspect, Logical Traffic Channels comprises a Dedicated Traffic Channel (DTCH), which is Point-to-point bi-directional channel, dedicated to one UE, for the transfer of user information. In addition, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and a plurality of PHY channels. The PHY channels comprise a set of DL channels and UL channels.

The DL PHY channels comprise: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); Load Indicator Channel (LICH); The UL PHY Channels comprises: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); Broadband Pilot Channel (BPICH).

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts or events of the various methods.

In addition, while a particular feature may have been disclosed with respect to only one of several implementations, such feature may be combined with one or more other features of the other implementations as may be desired and advantageous for any given or particular application. To the extent that the terms "includes" and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the evolved RAN (e.g., access point, eNode B) can infer or predict data traffic conditions and opportunities for facilitating handover to another type of RAT with reduced latency and connection errors based on previous interactions with the same or like machines under similar conditions.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for handover in a wireless communication system, comprising:

receiving, at a user equipment (UE), information regarding a neighbor list or a search algorithm to identify target systems for a handover;

transmitting, from the UE, a request for discontinuous reception (DRX) to facilitate a search for a target system based on the received information regarding the neighbor list or the search algorithm to identify target systems for the handover;

receiving a DRX grant in response to the request for DRX to facilitate the search for the target system based on the received information regarding the neighbor list or the search algorithm to identify target systems for the handover;

initiating the search for the target system in accordance with the DRX grant utilizing the received information regarding the neighbor list or the search algorithm to identify target systems for the handover; and transmitting a handover request based on a result of the search for the target system.

2. The method of claim 1, wherein receiving the DRX grant comprises receiving a DRX pattern comprising interlaces generated by a source NodeB.

3. The method of claim 1, wherein the DRX grant comprises interlaces, and wherein initiating the search for the target system comprises performing measurements at a timing determined in accordance with the interlaces.

4. The method of claim 3, wherein transmitting the handover request further comprises bundling the measurements in the handover request message.

5. The method of claim 3, wherein the measurements comprise at least one received power measurement.

6. The method of claim 1, wherein,
the request for DRX is transmitted to a source NodeB; and
the DRX grant is received from the source NodeB.

7. The method of claim 1, further comprising:
receiving a handover grant from a source NodeB.

8. The method of claim 7, wherein the handover grant is relayed by the source NodeB from the target system.

9. An apparatus for handover in a wireless communication system, comprising:
a transmitter configured to:
transmit a request for discontinuous reception (DRX) to facilitate searching for a target system based on received information regarding a neighbor list or a search algorithm to identify target systems for a handover, and
transmit a handover request based on a result of a search for the target system; and
a receiver, coupled with the transmitter, configured to:
receive the information regarding the neighbor list or the search algorithm to identify target systems for the handover;
receive a DRX grant in response to the request for DRX to facilitate the search for the target system based on the received information regarding the neighbor list or the search algorithm to identify target systems for the handover; and
search for the target system in accordance with the DRX grant utilizing the received information regarding the neighbor list or the search algorithm to identify target systems for the handover.

10. The apparatus of claim 9, wherein the DRX grant comprises interlaces generated by a source NodeB.

11. The apparatus of claim 10, wherein the search for the target system comprises performing measurements at a timing determined in accordance with the interlaces.

12. The apparatus of claim 9, wherein to transmit the handover request, the transmitter is configured to transmit the measurements bundled in a handover request message.

13. The apparatus of claim 9, wherein the measurements comprise at least one received power measurement.

14. The apparatus of claim 9, wherein the receiver is further configured to:
receive a handover grant from a source NodeB in response to the handover request.

15. The apparatus of claim 14, wherein the handover grant is relayed by the source NodeB from the target system.

16. A device for handover in a wireless communication system, comprising:
means for receiving, at a user equipment (UE), information regarding a neighbor list or a search algorithm to identify target systems for a handover;
means for transmitting, from the UE, a request for discontinuous reception (DRX) to facilitate a search for a target system based on the received information regarding the neighbor list or the search algorithm to identify target systems for the handover;
means for receiving a DRX grant in response to the request for DRX to facilitate the search for the target system based on the received information regarding the neighbor list or the search algorithm to identify target systems for the handover;
means for initiating the search for the target system in accordance with the DRX grant utilizing the received information regarding the neighbor list or the search algorithm to identify target systems for the handover; and
means for transmitting a handover request based on a result of the search for the target.

17. The device of claim 16, wherein,
the means for receiving the DRX grant comprises means for receiving interlaces generated by a source NodeB; and
means for initiating the search for the target system comprises performing measurements at a timing determined in accordance with the interlaces.

18. The device of claim 17, further comprising:
means for bundling the measurements in the handover request message, the measurements comprising at least one received power measurement.

19. The device of claim 16, further comprising:
means for receiving a handover grant from a source NodeB.

20. The device of claim 16, wherein the handover grant is relayed by the source NodeB from a target NodeB the target system.

21. A computer program product, comprising:
a non-transitory computer-readable medium comprising:
code for causing a computer to receive information regarding a neighbor list or a search algorithm to identify target systems for a handover;
code for causing a computer to transmit a request for discontinuous reception (DRX) to facilitate searching for a target system based on the received information regarding the neighbor list or the search algorithm to identify target systems for the handover;
code for causing a computer to receive a DRX grant in response to the request for DRX to facilitate searching for the target system based on the received information regarding the neighbor list or the search algorithm to identify target systems for the handover;
code for causing a computer to initiate a search for the target system in accordance with the DRX grant utilizing the received information regarding the neighbor list or the search algorithm to identify target systems for the handover; and
code for causing a computer to transmit a handover request based on a result of the search for the target system.

22. A method for handover in a wireless communication system, comprising:
transmitting, to a user equipment (UE), information regarding a neighbor list or a search algorithm to identify target systems for a handover;

receiving a request for discontinuous reception (DRX) from the UE to facilitate searching for a target system based on the transmitted information regarding the neighbor list or the search algorithm to identify target systems for the handover;

transmitting a DRX grant in response to the request for DRX from the UE to facilitate searching for the target system based on the transmitted information regarding the neighbor list or the search algorithm to identify target systems for the handover;

receiving a handover request from the UE based on a result of the search for the target system; and transmitting a handover grant in response to the handover request.

23. The method of claim 22, further comprising:
generating a DRX pattern comprising interlaces, the DRX grant comprising the DRX pattern.

24. The method of claim 23, wherein receiving the handover request further comprises receiving the measurements bundled in the handover request message.

25. The method of claim 22, wherein the DRX grant comprises interlaces, and wherein the search for the target system is performed by the UE and comprises measurements at a timing determined in accordance with the interlaces.

26. The method of claim 22, further comprising:
determining whether to grant the handover request.

27. The method of claim 22, further comprising:
transmitting the handover request to a target NodeB in the target system; and
receiving the handover grant generated by the target NodeB.

28. The method of claim 27, wherein transmitting the handover grant comprises:
relaying the handover grant received from the target NodeB to the UE.

29. An apparatus for handover in a wireless communication system, the apparatus comprising:
a receiver configured to:
receive a request for discontinuous reception (DRX) from a user equipment (UE) to facilitate searching for a target system based on transmitted information, to the UE, regarding a neighbor list or a search algorithm to identify target systems for a handover; and
receive a handover request from the UE based on a result of the search for the target system; and
a transmitter, communicatively coupled with the receiver, and configured to:
transmit, to the UE, information regarding the neighbor list or the search algorithm to identify target systems for the handover;
transmit a DRX grant to the UE in response to the DRX request to facilitate searching for the target system based on the transmitted information, to the UE, regarding the neighbor list or the search algorithm to identify target systems for the handover; and
transmit a handover grant to the UE in response to the handover request.

30. The apparatus of claim 29, wherein,
the apparatus comprises a source NodeB; and
the target system comprises a target NodeB.

* * * * *